Jan. 20, 1970 N. M. POOLE 3,490,609
PIPE LAYING SLEDS
Filed Sept. 9, 1968
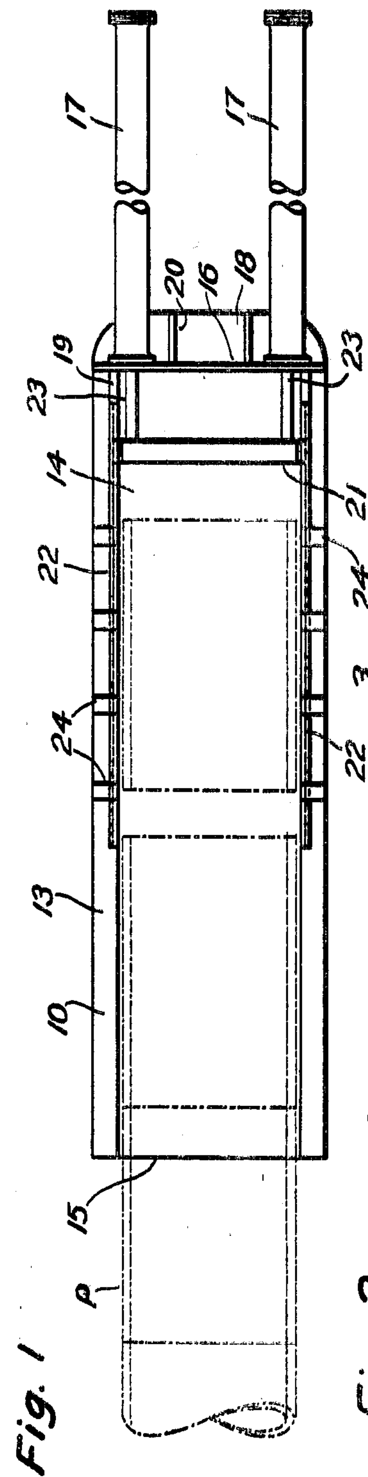
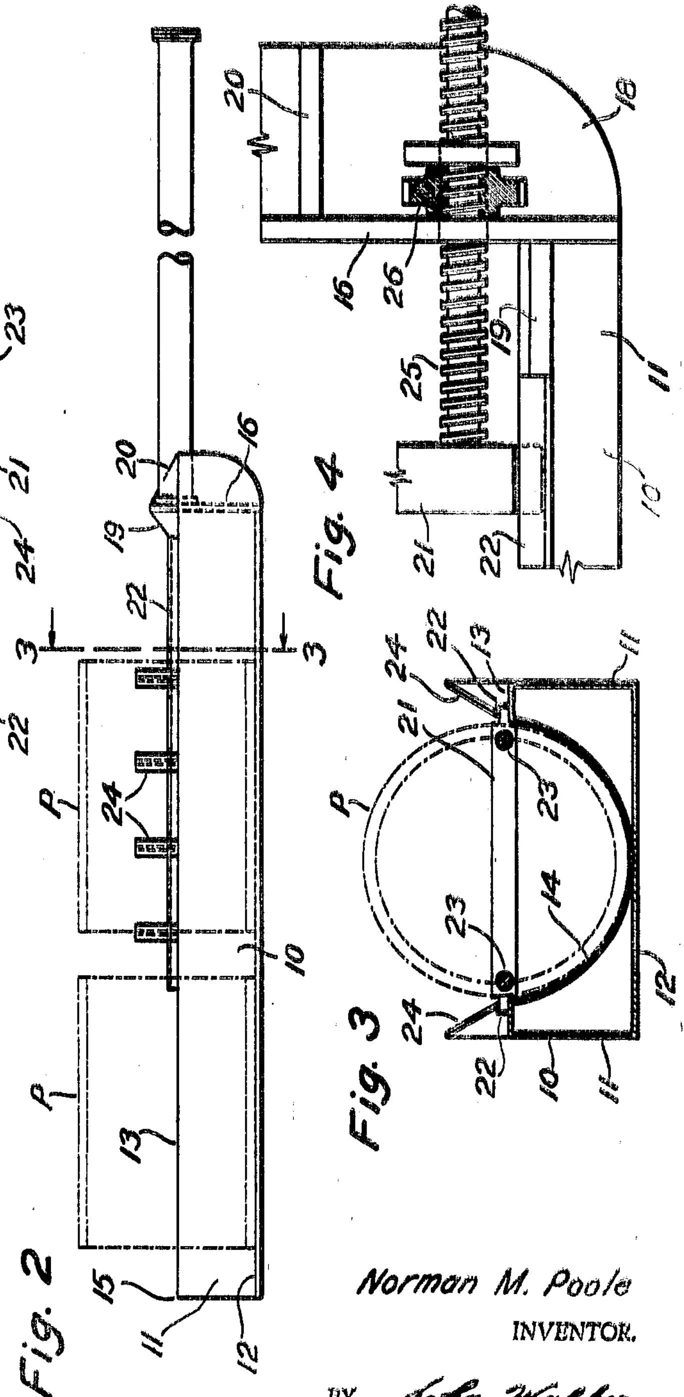
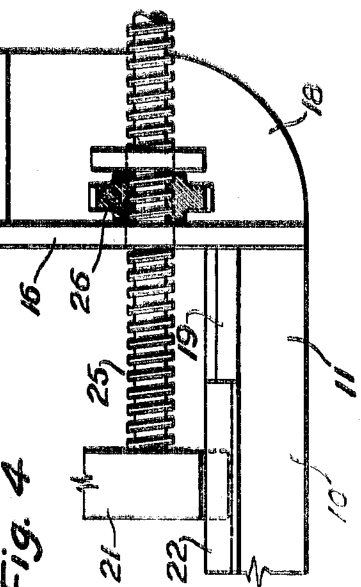
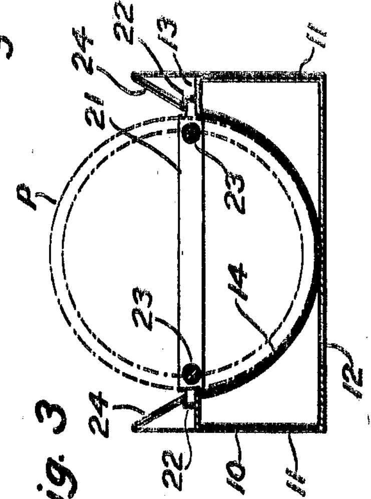
Norman M. Poole
INVENTOR.
BY John Walker
AGENT United States Patent Office 3,490,609
Patented Jan. 20, 1970

3,490,609

PIPE LAYING SLEDS

Norman M. Poole, Lafayette, Calif.
(16694 Maple St., Fountain Valley, Calif. 92708)

Filed Sept. 9, 1968, Ser. No. 758,483
Int. Cl. B65g *67/24*
U.S. Cl. 214—1 6 Claims

ABSTRACT OF THE DISCLOSURE

A pipe aligning device having a ram adapted to consecutively connect sections of relatively large concrete pipe, and automatically reposition itself for the handling of each additional length.

This invention relates to equipment used in the installation of relatively large and heavy pipe employed in the construction of sewer systems and the like. More particularly it relates to a device adapted to the alignment, connection, and positioned reception of consecutive lengths of pipes of such installations.

The operations of laying pipe of large diameter and consequently relatively great weight is, as presently practiced, a costly and time consuming undertaking. This is especially true when offshore installation is involved. Derrick barges and their crews are required to be in constant attendance, and the greater part of the time expended in the use of this expensive equipment is spent in making the actual coupling of adjacent sections. Also, in underwater installation, where wave action and tidal flow is frequently encountered, misalignment of a section results, causing displacement of an O ring, gasket, or other joint sealing means.

It is the principal object of the present invention to provide a device which will enable successive lengths of pipe to be accurately aligned and permanently connected.

A further object of the invention is the provision of a device which, upon the joining of one section to one previously laid, will automatically position itself for the reception of the next length to be installed.

A still further object of the invention is the provision of such a device that will be of simple construction, will be easy to operate, and which can be used for either onshore or off-shore operations.

These and other objects of the invention will become apparent during the course of the following description and appended claims, taken in connection with the accompanying drawing forming a part hereof, and in which:

FIGURE 1 is a plan view of a preferred embodiment of my invention, adjacent pipe sections being indicated in phantom thereon.

FIGURE 2 is a side elevation of the device illustrated in FIG. 1.

FIGURE 3 is an enlarged vertical, transverse cross section taken on line 3—3 of FIG. 2.

FIGURE 4 is an enlarged fragmentary detail showing a modified type of drive.

Referring to the drawing in detail, a cradle 10, which has been illustrated as being of fabricated and welded steel construction, and is of substantially rectangular cross section, comprises sides 11, a bottom 12, and a top 13, all extending the complete length thereof. The top 13, as can be seen by reference to FIG. 3, is of arcuate, concave configuration for the greater part of its width, being provided with a semi-circular channel 14 having a radius slightly in excess of that of the pipe it is designed to handle. This is a precautionary measure designed to preclude the excessive friction which would result by attempting to move sections of pipe longitudinally within the said channel 14, if the pipe were of too close a fit therein.

The cradle 10 is open at the end 15, in order to allow free movement between the cradle and the sections of pipe P, during the installation thereof. At the opposite end, the cradle is fitted with an end plate 16 which will be designed to accommodate the fixed assembly of a pair of hydraulic cylinders 17. These cylinders extend rearwardly from the said plate, and are in spaced and symmetrical relationship with reference to a longitudinal median line of plan view of FIG. 1. Adequate reinforcement, to ensure a rigid alignment of the cylinders 17, will be provided by any approved design such as the illustrated rib 18, and ribs or gussets 19 and 20. This, however, is purely incidental to the inventive concept, and constitutes no limitation or restriction thereof.

A horizontal ram head 21, extends transversely across the cradle 10 in substantially diametrical relationship to the channel 14, and being perpendicular to the longitudinal axis thereof. The ram head is adapted to longitudinal, reciprocal motion within the range of a pair of guide tracks 22, one being located at each end of the said ram head as indicated. The rods 23 of the cylinders 17 are attached to the ram head 21, which is thereby actuated by the operation of the cylinders. While a pair of cylinders has been indicated, it will be understood that a centrally disposed, single cylinder could be used.

In order to facilitate the placement of the pipe sections within the cradle 10, a plurality of pairs of upstanding guide members 24, has been provided. These members are in paired and laterally confronting relationship, their guiding faces diverging upwardly. The individual pairs are located and spaced with relation to the tracks 20 so as to ensure maximum ease of placement of a section of pipe within the cradle.

The detail of FIG. 4 illustrates a modified method of actuating the ram head. In this design, threaded rods 25 are substituted in place of the hydraulic cylinders. A nut 26, which can be in the form of a pinion as illustrated, can be mounted in similar fashion to the method shown, and connected to a source of power, not indicated, in any satisfactory manner.

The driving end of the device will be rounded on the bottom and both sides in order that the entire unit can be moved as a sled on any terrain on which it may be in use, on land or beneath water. The dimensions of the device will be determined by the size of pipe a particular unit is designed to handle. In the case of 16 foot lengths of pipe of 10 foot diameter, the overall length of the fabricated section will be in the neighborhood of 50 feet. By reference to FIGS. 1 and 2, which illustrate a section of pipe as it is placed in the cradle, it will be seen that there is space at each end of the section, approximately 22 feet being allowed for the free loading of a section between the ram head and the end of a previously laid length. Also, the open end of the cradle will still be situated beneath the last installed section of pipe by about 3 feet. This relationship will positively ensure the alignment of pipe and cradle during the entire operation.

A unit of the size just described will be fitted with cylinders having a stroke of approximately 26 feet. After a section has been lowered in place as indicated, operation of the cylinders will force the loose length into engagement with its adjacent and previously installed section. With the pipe ends now in contact, further operation of the cylinders will cause the unit to slide longitudinally away therefrom, over the surface of the supporting ground, due to the reaction set up by the stationary pipe already placed. The stroke of the cylinders will be so controlled that this sliding action will be of an extent equal to the length of the particular sections of the pipe being laid. It will be obvious that by this arrangement, each time a joint is made, the sled or cradle will be in the right position to receive, and ensure the alignment of, the next section of pipe, the ram head having been retracted to allow its reception therein.

From the foregoing it will be apparent that I have provided a means of laying pipe of the type described, that will not only ensure correct alignment and perfect mating of each successive length, but will also greatly expedite the entire operation, and thereby release costly equipment for other work.

While I have disclosed a preferred embodiment of my invention, it will of course, be understood that more elaborate designs can be created. For example, the ram head driving members, either cylinders or screws, can be mounted, one on each side of the cradle, and be operatively connected thereto.

I claim:

1. A pipe laying device comprising a cradle having a pipe receiving, longitudinal recess therein, and being open at one end thereof, the opposite end being closed and being formed by a continuation of the bottom of said cradle, said bottom being curved forwardly and upwardly to extend laterally across the space between the sides of said cradle, the bottom of said cradle presenting a smooth and continuous load bearing sruface substantially over its entire flat area, a transverse ram member slidably mounted across the recess of said cradle, and being spaced above the bottom of the pipe receiving recess of said cradle a distance substantially equal to the radius of pipe to be contacted thereby, and power means mounted on said cradle and being operatively connected to said ram member for advance and retractive motion thereof for sliding the cradle from under the pipe while the ram member is engaged with the pipe and retracting the ram member away from the pipe while the cradle is stationary.

2. A device as in claim 1, wherein said power means comprises a fluid-pressure cylinder.

3. A device as in claim 1, wherein said power means comprises a plurality of fluid-pressure cylinders.

4. A device as in claim 1, wherein said power means comprises a screw member fixedly attached to said ram member, a rotatable nut engaging said screw member and being restrained from longitudinal movement relative to said cradle and means adapted to drive said nut.

5. A device as in claim 1 having guide tracks adapted to maintain the alignment of said ram member.

6. A device as in claim 1 having guide members adapted to facilitate the placement of pipe sections therein.

References Cited

UNITED STATES PATENTS

| | | | |
|---|---|---|---|
| 1,119,353 | 12/1914 | Jackson | 214—82 |
| 2,538,365 | 1/1951 | Jones | 214—1 |
| 2,748,965 | 6/1956 | Grey. | |
| 3,389,815 | 6/1968 | Houser | 214—82 |

GERALD M. FORLENZA, Primary Examiner

F. E. WERNER, Assistant Examiner

U.S. Cl. X.R.

214—82, 350